Patented Oct. 17, 1950

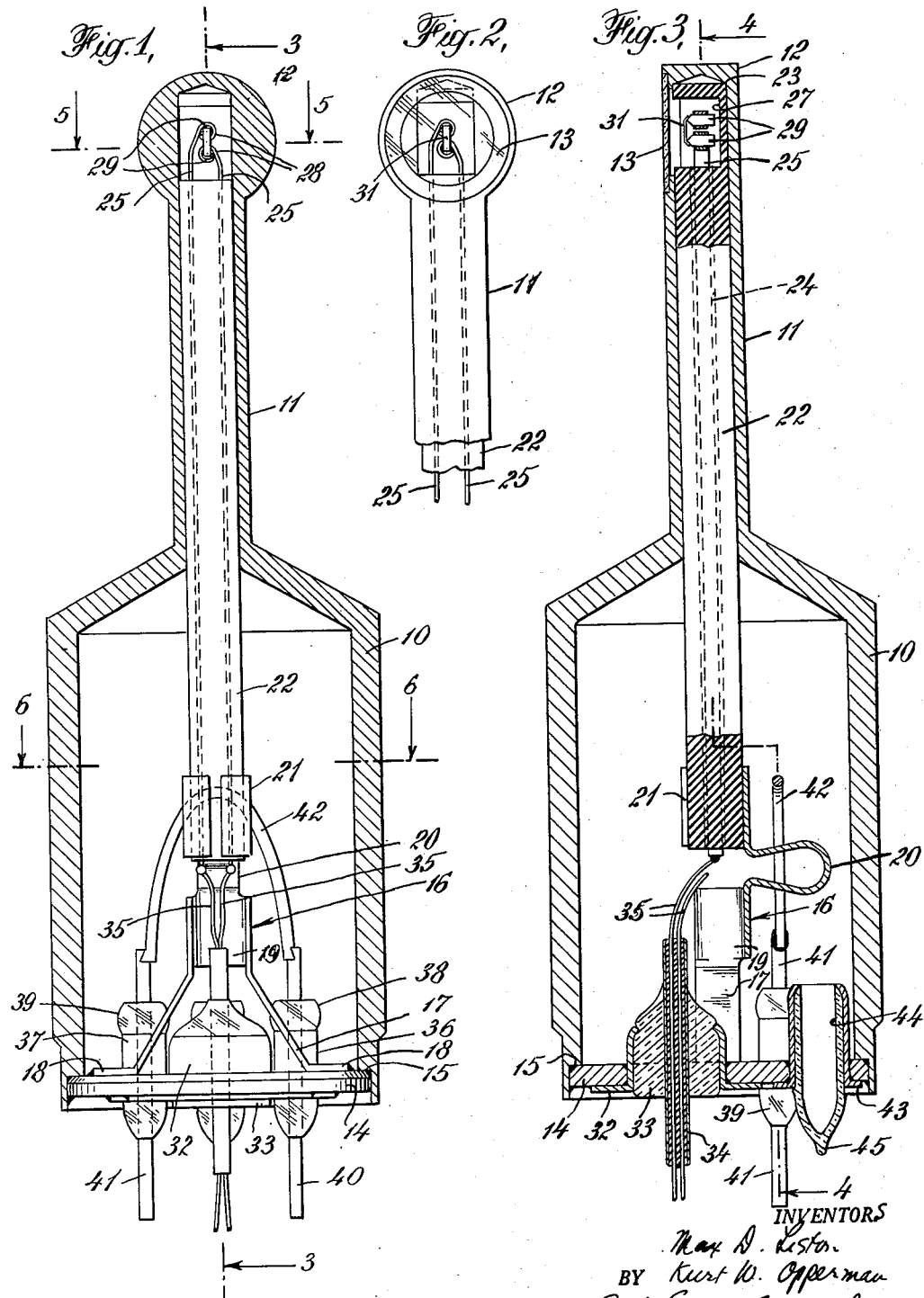

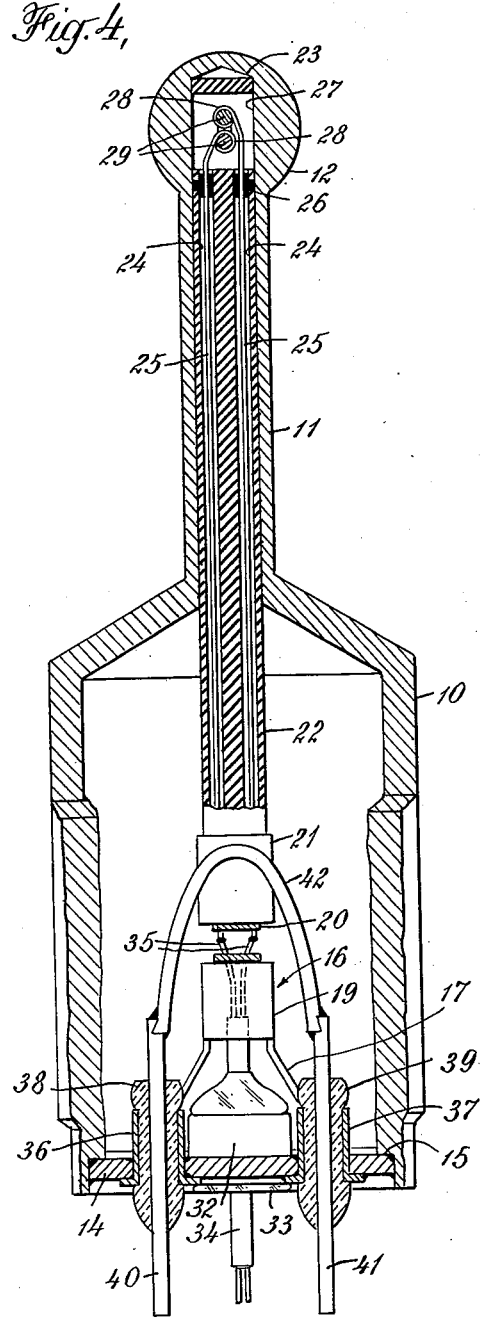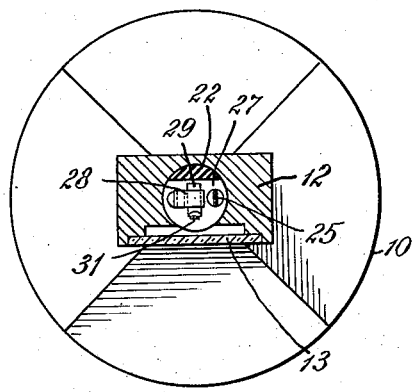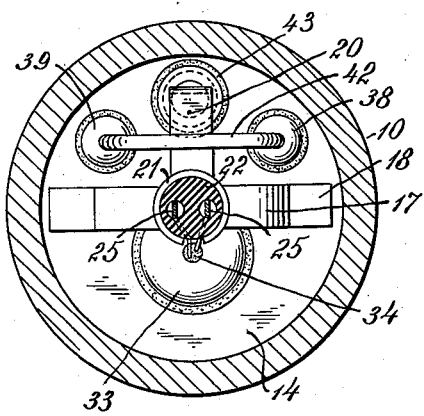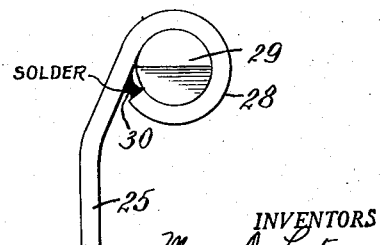

2,526,492

UNITED STATES PATENT OFFICE 2,526,492

THERMOPILE

Max D. Liston, Wilton, and Kurt W. Opperman, Stamford, Conn., assignors to The Perkin-Elmer Corporation, Glenbrook, Conn., a corporation of New York Original application July 31, 1947, Serial No. 765,012. Divided and this application August 9, 1949, Serial No. 109,276

1 Claim. (Cl. 136—4)

This invention relates to thermo-electric devices for use in the detection and measurement of radiation. More particularly, the invention is concerned with a novel thermopile which performs well, is not readily susceptible to damage by shock or vibration, is of high sensitivity, and is relatively easy to manufacture.

The subject matter of this application is disclosed in our copending application Serial No. 765,012, filed on July 31, 1947, of which this application is a division.

Thermopiles now in use possess certain structural and operational disadvantages which it is the purpose of this invention to overcome. Among these disadvantages is the fact that present thermopiles do not provide their included thermocouples with a sufficient degree of freedom from damage by shock or vibration. Another disadvantage is that in present thermopiles it is difficult to maintain a vacuum which is satisfactory for high sensitivity of thermocouple operation. Also, present theremopiles are difficult to manufacture for numerous reasons.

The present invention is directed to a thermopile which comprises a unitary thermocouple assembly and a housing for it. The thermocouple assembly is constructed first, the thermocouple itself being resiliently supported, and then the assembly is inserted into the housing and secured therein by a vacuum seal. The assembly is provided with an evacuating tube, by which the thermopile housing may be evacuated after the thermocouple assembly is mounted in it, and is also provided with a getter by which residual gases may be cleaned up. The high order of vacuum maintained makes possible the high sensitivity of the thermo-couple desired and the resilient mounting for the thermocouple provides the necessary freedom from damage through shock or vibration.

For a better understanding of the invention, reference may be made to the accompanying drawings, in which:

Fig. 1 is a longitudinal sectional view of one form of thermopile embodying the invention;

Fig. 2 is a view in elevation of a part of the thermopile;

Fig. 3 is a sectional view on the line 3—3 of Fig. 1;

Fig. 4 is a sectional view on the line 4—4 of Fig. 3;

Figs. 5 and 6 are sectional views on the lines 5—5 and 6—6, respectively, of Fig. 1; and Fig. 7 is a view in side elevation, on an enlarged scale, of one form of mounting for a thermo-electric element.

The thermopile illustrated in the drawings includes a metallic housing 10 of circular cross-section and provided at its upper end with a neck 11, which terminates in a head 12. The lateral wall of the neck is cut away near its free end to provide an opening which is closed by a window 13 of suitable transparent material, as, for example, rock salt, when the thermopile is to be used in the infrared field.

The end of the housing opposite that, from which the neck extends, is closed by a metal plate 14, which is seated against a circumferential shoulder 15 on the housing wall and held in place by solder. A standard 16, made of sheet metal, is mounted on the inner face of plate 14 and it includes a pair of upwardly convergent legs 17 having flat lower end portions 18, which rest on the inner face of plate 14 and are secured thereto as by soldering. The legs are connected at their upper ends to a central section 19 of generally cylindrical form and a flat spring strip 20 bent to loop shape is connected to the top of the central section and, at its free upper end, supports a spring clamp 21 of cylindrical form. The standard is so formed and mounted that the clamp 21 is concentric with the opening through neck 11.

A cylindrical insulator 22, preferably of ceramic material, is mounted at its lower end in the clamp 21 and extends upwardly through the housing and through the neck to the closed upper end thereof. The insulator is urged upwardly through the neck by spring 20 and held against the inner wall 23 of the top of the neck, which serves as a stop. The insulator is formed with a pair of parallel lengthwise passages 24 (Fig. 4) through which extend conductors 25. Each conductor is a flat strip, preferably made of silver, and the conductors are held in place in their respective passages with their flat faces opposed by insulating material 26, which is introduced into the passages through lateral openings through the insulator, and then allowed to harden. A portion of the insulator adjacent its outer end is cut away to form a chamber 27, into which the ends of the conductors 25 extend.

Thermo-electric elements may be mounted in the free ends of the conductors in various ways, but the preferred forms of mountings are those disclosed in our copending application Serial No. 765,012, one of which is illustrated in the accompanying drawings and is as follows. The free ends of the conductors within chamber 27 are bent to form hooks 28, which lie one above the other in the axis of the insulator. The thermo-electric elements 29, which may be made of any of the well known metallic materials used for the purpose, have the form of small rods or pins and the diameter of each element is slightly less than the opening through a hook, when the hook is at normal temperature. In order to insert an element in place, the end of the hook is pried away from the stem of the hook to enlarge the opening defined by the hook, and the element is then placed in the opening and the end of the hook released. The resilience of the hook causes it to grip the element and the gripping force may be increased by placing a drop 30 (Fig. 7) of molten solder between the end and the stem of the hook. When the solder cools and shrinks, the pressure applied to the element by the hook is increased.

In the construction shown, the conductors 25 are so mounted in the passages through the insulator that the elements, when mounted in the hooks, lie parallel and transverse to the axis of the insulator. The axes of the elements extend normal to the plane of the window and the end of each element adjacent the window is formed with a pair of flat converging surfaces, which meet in a line parallel to the surface of the window. The tapered ends of the elements are connected by a piece of gold foil 31, one flat face of which is secured to the elements by welding. The outer face of the foil, which is exposed through the window, is blackened in any suitable manner.

The plate 14 has a number of openings therethrough and a metallic bushing 32 is mounted in one of the openings and has a flange lying against the outer surface of the plate. The bushing is held in position in the plate by solder and the interior of the bushing is filled by a body of glass 33 sealed to the bushing. A metallic tube 34 is sealed through the body of glass. A pair of conductors 35 pass through tube 34 and are insulated from one another and from the tube by resin, which fills the interior of the tube around the conductors. The conducting strips 25 project downwardly beyond the end of the insulator and are connected to the inner ends of conductors 35.

Another pair of openings through plate 14 contain bushings 36, 37 welded in place and containing bodies of glass 38, 39 sealed to the bushings. Conductors 40, 41 are sealed through the glass and their inner ends are connected by a wire 42 having a coating of a gettering material.

The last opening through the plate 14 contains a bushing 43 lined with a glass tube 44 sealed to the bushing. This tube provides means for connecting the interior of the housing to a vacuum pump, in order that the housing may be evacuated and, after the desired degree of vacuum has been established within the housing, the tube 44 is sealed off from the pump as indicated at 45. The getter is vaporized from wire 42 to clean up residual gases by passing a current through the wire.

The thermopile may be easily and readily assembled by first completing the subassembly of parts supported by plate 14 and then inserting the subassembly into the housing 10 and soldering the plate 14 in place. The thermopile is then, as indicated, evacuated through glass tube 44 and gettered. The thermopile, so constructed, may be easily taken apart for replacement or repair of any of the parts. For instance, if the vacuum within the thermopile decreases, the base plate 14 may be removed, along with its supported structure, by breaking the solder which holds it in place, and wire 42 may be recoated with gettering material and the thermopile assembled again and evacuated as described.

We claim:

A thermo-electric device which comprises an evacuated metallic housing including a chamber having an opening at one end closed by a metal plate and an integral neck leading from the opposite end of the chamber, the neck having an opening near its outer end closed by a transparent window, a mounting within the chamber attached to the inner face of the plate, the mounting including a clamp and a spring urging the clamp toward the outer end of the neck, an insulator mounted in the clamp and having a pair of lengthwise passages through it, a stop within the neck against which the insulator is forced by the spring, conductors in the respective passages in the insulator, each conductor having an end exposed beyond the outer end of its passage and adjacent the window, thermo-electric elements mounted on the conductors at the exposed ends thereof, a piece of foil connecting the elements and having a flat face exposed through the window, and connections to the conductors sealed through the plate.

MAX D. LISTON.
KURT W. OPPERMAN.

REFERENCES CITED

The following references are of record in the file of this patent:

UNITED STATES PATENTS

| Number | Name | Date |
| --- | --- | --- |
| 2,122,262 | Nergaard | June 28, 1938 |
| 2,266,416 | Duclos | Dec. 16, 1941 |
| 2,305,396 | Volochine | Dec. 15, 1942 |

OTHER REFERENCES

Strong, J.: Procedures in Experimental Physics (1942) pages 309, 316, 318.